United States Patent [19]
Bartlett

[11] Patent Number: 5,400,694
[45] Date of Patent: Mar. 28, 1995

[54] HYDRAULIC CYLINDER WITH INTERNAL SAFETY VALVE

[75] Inventor: William P. Bartlett, Dodge Center, Minn.

[73] Assignee: McNeilus Truck and Manufacturing, Inc., Dodge Center, Minn.

[21] Appl. No.: 205,568

[22] Filed: Mar. 4, 1994

[51] Int. Cl.⁶ .................. F15B 11/08; F15B 15/26
[52] U.S. Cl. ........................... 91/468; 60/466; 92/15
[58] Field of Search ............ 92/85 R, 443, 27, 28, 92/15; 91/41, 45, 405, 468; 60/466, 481

[56] References Cited

U.S. PATENT DOCUMENTS

| | | |
|---|---|---|
| 2,093,015 | 5/1937 | Madden . |
| 2,821,209 | 1/1958 | Waterman . |
| 3,142,342 | 7/1964 | Brudnak et al. ............... 60/466 |
| 3,200,214 | 8/1965 | Aubert . |
| 3,228,658 | 1/1966 | London . |
| 3,581,625 | 6/1971 | Michalak ............... 91/45 |
| 4,276,975 | 7/1981 | Jenkins . |
| 4,522,285 | 6/1985 | Salmon et al. ............ 187/22 |
| 5,097,748 | 3/1992 | Koch et al. ............ 91/45 X |
| 5,107,679 | 4/1992 | Bartlett . |
| 5,215,178 | 6/1993 | Bartlett . |
| 5,235,896 | 8/1993 | Huber ............... 91/45 X |

FOREIGN PATENT DOCUMENTS

| | | | |
|---|---|---|---|
| 1217199 | 5/1980 | France . | |
| 2603978 | 4/1977 | Germany ............... 91/468 |
| 238747 | 7/1969 | U.S.S.R. ............... 51/468 |

*Primary Examiner*—Edward K. Look
*Assistant Examiner*—Hoang Nguyen
*Attorney, Agent, or Firm*—Haugen and Nikolai

[57] ABSTRACT

An internal safety valve for preventing the discharge chute from rapidly falling due a sudden loss of hydraulic fluid pressure. A safety valve assembly for use in a hydraulic cylinder consisting of a safety valve located in the barrel of a hydraulic cylinder. The moveable piston of the hydraulic cylinder has a cavity for receiving the safety valve therein. The safety valve is actuated when the flow leaving the chute lift cylinder exceeds a predetermined flow. The valve immediately stops the hydraulic fluid from leaving the chute lift cylinder maintaining the position of the discharge chute.

3 Claims, 2 Drawing Sheets

5,400,694

HYDRAULIC CYLINDER WITH INTERNAL SAFETY VALVE

BACKGROUND OF THE INVENTION

This invention relates generally to a safety valve for use in a hydraulic line system which prevents flow of a working hydraulic fluid above a specific flow rate and more particularly to a safety valve which is located in the barrel of a chute lift cylinder of a ready mix concrete truck.

The delivery chute on the rear of ready mix concrete trucks is conventionally raised and lowered by means of a hydraulic cylinder. In normal operating use, the chute is often full of concrete and held in position by a hydraulic cylinder. The hydraulic hose connected to the hydraulic cylinder is subject to wear, damage, and deterioration by the nature of its application. Frequent inspections for cuts, abrasions, wear, acid wash damage, etc., are necessary to prevent hose failure during operation. Failure may occur if the hose is not regularly inspected. Failure also results from damage occurring on the job site. Workers tugging and pulling on a heavy, full concrete chute can cause pressure spikes in the hydraulic fluid flowing through the chute lift hydraulic hose. Workers can also use the hydraulic hose connection to the cylinder as a hand hold which causes further damage and wear to the hose and connection. Previously damaged hoses may break from the pressure spikes in the chute lift hydraulic hose. A broken hose results in a sudden pressure loss and the fluid flow is no longer controlled. The sudden loss of pressure results in hydraulic fluid rapidly flowing from the hydraulic cylinder, resulting in the chute crashing downward and potentially seriously injuring workers.

What is needed is a way to prevent the chute from crashing downward due to a sudden loss of hydraulic fluid pressure.

SUMMARY OF THE INVENTION

The present invention is a safety valve which prevents the chute from rapidly falling due to a sudden loss of hydraulic fluid pressure. The safety valve is located in the interior of the chute lift hydraulic cylinder. The cylinder mount is drilled and tapped to provide for the safety valve located in the cylinder's barrel and the cylinder's port located in the cylinder mount. Normal hydraulic fluid flow coming out of the chute lift cylinder is less than three gallons per minute. The gallons per minute flow increases dramatically should the hydraulic hose break. The safety valve is activated any time the flow leaving the chute lift cylinder exceeds a predetermined value, e.g., approximately four gallons per minute. The safety valve immediately blocks further hydraulic fluid from leaving the chute lift cylinder and, thus, the chute cannot fall.

The principle object of this invention is to provide an internal safety valve to prevent the rapid falling of a hydraulically held concrete chute due to sudden loss of hydraulic pressure because of a hydraulic line failure.

Another object is to provide an internal safety valve that directly mounts into the chute lift cylinder barrel.

Still another object of the present invention is to provide a quick responsive flow fuse that adds minimal bulk to the hydraulic cylinder.

These and other objects and advantages of the invention will become apparent to those skilled in the art from the following detailed description of a preferred embodiment, especially when considered in conjunction with the accompanying drawings which like numerals in the several views refer to corresponding parts.

DETAILED DESCRIPTION OF THE PREFERRED EMBODIMENT

Figure 1:
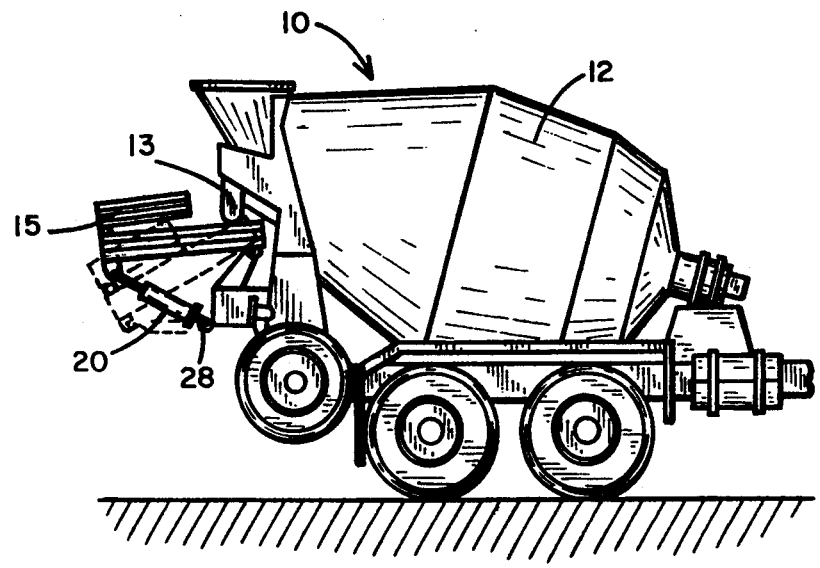
FIG. 1 is a partial side view of a ready mix concrete truck with an extended concrete chute incorporating the present invention.

As shown in FIG. 1, a work type vehicle, namely a ready mix concrete truck, is indicated generally by 10. It includes a rotatable mixer drum 12. Cement or concrete is emptied through discharge spout 13 into a discharge chute 15. This discharge chute 15 is used to cause the concrete to flow into a bucket, wheel barrel or to a space defined by erected concrete forms. Discharge chute 15 is positioned by means of the chute lift hydraulic cylinder 20. Workers also pull and tug on the chute for lateral positioning thereof.

Figure 3:
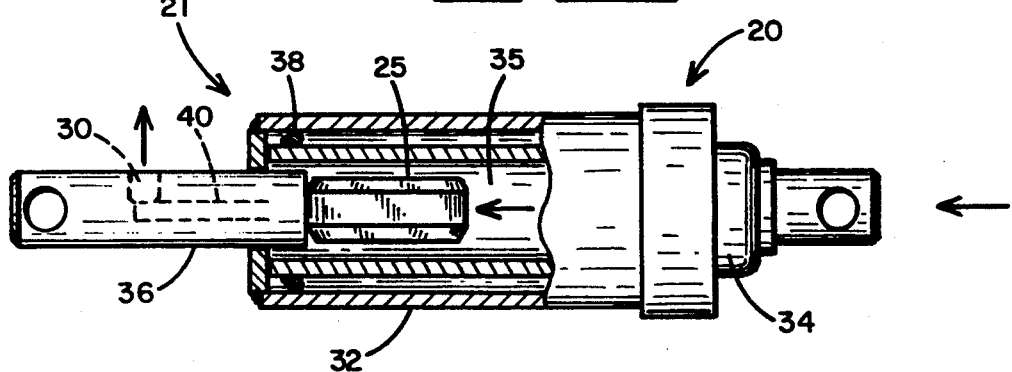
FIG. 3 is a view of an extended hydraulic cylinder partially cut away to show the location of the safety valve in the barrel of the hydraulic cylinder.

The present invention relates to a hydraulic cylinder safety valve assembly designated generally as 21, consisting of a safety valve device 25 located within the discharge chute cylinder 20. A hydraulic hose 28 is connected to the inport valve 30 of the discharge chute cylinder 20. The discharge chute cylinder used typically is a displacement single action hydraulic cylinder. Controlled flow of the hydraulic fluid is from the hydraulic hose 28 into the cylinder 20 when the cylinder is extended and from the cylinder 20 to the hydraulic hose when the cylinder is retracted. The cylinder 20 consists of a barrel 32, piston 34, cylinder mount 36 and a moving seal 38. The cylinder mount is drilled and tapped for the intake valve 30 and the safety valve 25. A bore 40 connects intake valve 38 with a longitudinal bore 41 of the safety valve device 25. The safety valve 25 is located within bore 31 of the cylinder barrel 32 adjacent the cylinder mount 36. The piston 34 is mounted for reciprocation within the barrel 32. When the piston 34 is in the extended position the cement chute is raised as shown by the solid lines in FIG. 1. When the piston 34 is in the retracted position as shown in FIG. 3 and by the broken lines of FIG. 1, the cement chute 15 is lowered. The piston 34 has an internal cavity 35 which receives the safety valve 25 when in the retracted position shown in FIG. 3.

The safety valve 25 is shown in FIGS. 2, 3, 4 and 5. The safety valve 25 is threaded onto the cylinder mount 36. The valve 25 contains a longitudinal bore 41 and counter bore 42. The counter bore 42 contains a moveable cylindrical spool 44, compression spring 46, and a poppet 48 which will be described in further detail below. The poppet valve seat 48 is located in the counter bore 42 and has a radial flange 50 and base 52 containing opening 54. The flange 50 is located at the end of the valve 25 adjacent the cylinder mount 36 and longitudinal bore 41. The poppet 48 has a main cylindrical body 56 containing a bore 58. The main cylindrical body 56 tapers to a section containing two opposed ports. These two ports 60 and 62 provide for fluid communication between the poppet bore 58 and the valve interior 42. The poppet 48 then tapers into a conical end 64.

Figure 4:
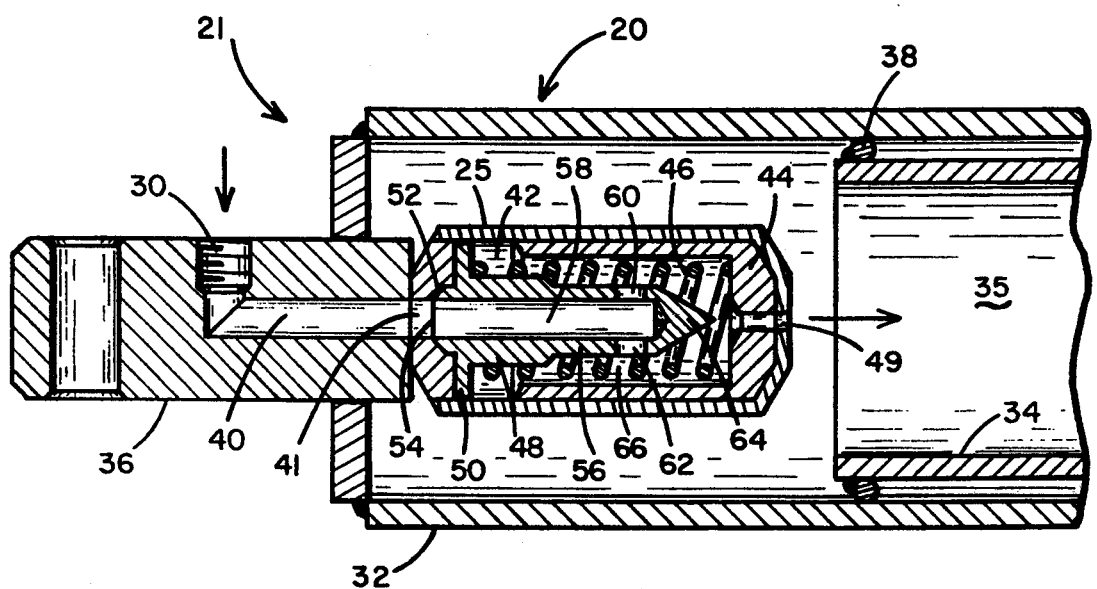
FIG. 4 is a cross sectional view of the hydraulic cylinder with the flow valve in an open position.
Figure 5:
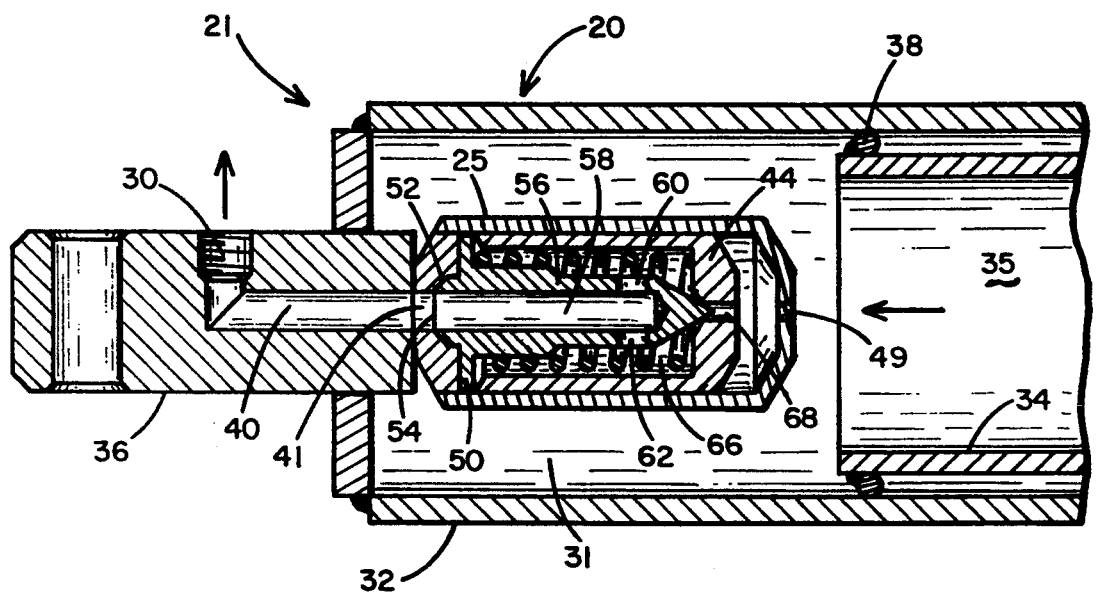
FIG. 5 is a cross sectional view of the hydraulic cylinder with the valve in a closed position.

The spool 44 is located within counter bore 42. The spool spring 46 is also located within bore 42 and extends into the spool interior 66. A portion of spool spring 46 surrounds the poppet 48. FIG. 4 shows the spring during controlled flow. Spool spring 46 provides the biasing means to urge spool 44 away from the poppet 48, creating a fluid passage way through the ports 60 and 62 into the spool interior 66 and through the spool aperture into the cylinder barrel. The valve operates to restrict flow when the fluid pressure on the spool surrounding the aperture increases compressing spool spring 46 forcing the spool aperture 68 against the conical end 64 of the poppet 48. This is the closed position shown in FIG. 5. The aperture 68 of the spool 44 is of a diameter greatly smaller than the diameter of the spool and the counter bore 42. This aperture may, for example, be 0.125".

Figure 2:
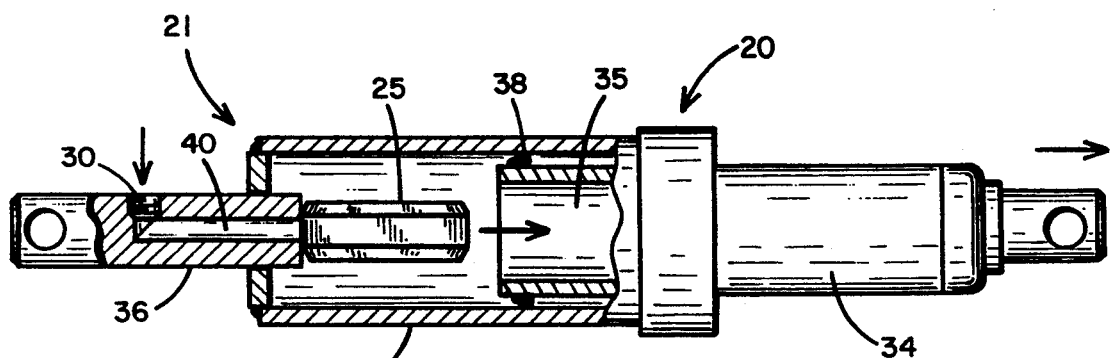
FIG. 2 is a view of a retracted hydraulic cylinder partially cut away to show the location of the safety valve in the barrel of the hydraulic cylinder.

The arrows in the FIGS. 2 and 3 show the flow of fluid from the cylinder through the valve during extension and retraction of the cylinder. In FIGS. 2 and 4, hydraulic fluid flows from the cylinder port fluid inlet valve 30 into the cylinder mount bore 40 and then into the flow valve inlet 41. From the inlet 41, fluid passes into the poppet bore 58 and out of the ports 60 and 62. The flow then enters the interior 66 of the spool 48 where it passes through the spool aperture 68 into the counter bore 42 and finally through flow valve port 49 into the cylinder barrel. The introduction of fluid into the hydraulic cylinder barrel 32 and bore 35 causes the piston 34 to extend from the cylinder barrel 32. When it is desired to retract the piston 34 to lower the cement chute 15, the hydraulic fluid is released from the hydraulic piston 34 and flows in the opposite direction through the valve 25.

Fluid will readily pass in either direction when the flow rate in the valve 25 is less than a predetermined rate, e.g., approximately four gallons per minute. The flow rate less than the predetermined rate is the controlled rate of the hydraulic system. The spring 46 has sufficient stiffness such that the fluid pressure on the spool surface as fluid enters the spool aperture 68 is insufficient to cause the spool 44 to move against the force of the spring 46. When the flow rate into the valve 25 from the cylinder 20 exceeds approximately four gallons per minute, the fluid pressure on the spool 44 surface will increase as the fluid rushes to enter the spool aperture 68. The increased fluid pressure on the spool 44 surface causes the spool 44 to move against the force of the spring 46 towards the poppet 48. The spool 44 moves until the aperture 68 engages the conical end 64 of the poppet 48. The spool aperture 68 is blocked thereby restricting fluid flow.

In the event the hydraulic hose breaks, the fluid pressure decreases rapidly on the system port end. Hydraulic fluid leaves the cylinder 20 at an increased flow rate to compensate for the sudden pressure decrease. Accordingly, fluid pressure increases against the spool 44 surface as the hydraulic fluid rushes to enter the spool aperture 68 at an increased flow rate. When the flow rate exceeds the predetermined flow rate, the spool 44 moves against the force of the spring 46 towards the poppet 48. The flow is restricted as the conical end 64 of the poppet engages the spool aperture 68. Hydraulic fluid can no longer flow through the safety valve. Consequently, the hydraulic fluid remains in the hydraulic cylinder maintaining the position of the concrete discharge chute.

It is understood that the above disclosure of the presently preferred embodiment is to be taken as illustrative of the invention. Furthermore, it is to be understood that those skilled in the art be capable of making modifications without departing from the true spirit and scope of the invention.

What is claimed:

1. A hydraulic cylinder safety valve assembly comprising:
   a. a hydraulic cylinder;
   b. a safety valve located in a barrel of said hydraulic cylinder;
   c. a moveable piston of said hydraulic cylinder having a cavity for receiving said safety valve therein;
   e. a cylinder mount drilled and tapped to receive said safety valve; and
   d. a piston retracted position wherein said safety valve is received within said cavity of said moveable piston.

2. The hydraulic cylinder safety valve assembly of claim 1 and further comprising said safety valve having:
   a. a longitudinal bore for defining a fluid inlet port and a counter bore defining a cylindrical chamber;
   b. a generally tubular spool disposed in said cylindrical chamber for longitudinal movement, said spool being generally closed at one end except for a fluid passageway of a predetermined small diameter relative to that of said fluid inlet port;
   c. a valve seat member disposed in said cylindrical chamber in a line with said fluid passage; and
   d. spring means for normally maintaining said one end of said spool out of contact with said valve seat member but permitting movement of said spool against said valve seat member upon a predetermined loss of pressure in said hydraulic cylinder; and said valve means being normally open to permit flow of hydraulic fluid therethrough in the event the flow rate exceeds a predetermined valve.

3. In combination with a ready mix concrete truck of the type including a discharge chute positionable by a hydraulic cylinder coupled and in circuit with a hydraulic pump by a hose, a safety device for preventing said chute from dropping upon a failure of said hose comprising a flow responsive valve means coupled to said hydraulic line within said hydraulic cylinder, said flow responsive valve means having:
   a. a longitudinal bore for defining a fluid inlet port and a counter bore defining a cylindrical chamber;
   b. a generally tubular spool disposed in said cylindrical chamber for longitudinal movement, said spool being generally closed at one end except for a fluid passageway of a predetermined small diameter relative to that of said fluid inlet port;
   c. a valve seat member disposed in said cylindrical chamber in a line with said fluid passage;
   d. spring means for normally maintaining said one end of said spool out of contact with said valve seat member but permitting movement of said spool against said valve seat member upon a predetermined loss of pressure in said hydraulic cylinder; and said valve means being normally open to permit flow of hydraulic fluid therethrough in the event the flow rate exceeds a predetermined value; and e. said hydraulic cylinder having a retracted position wherein said flow responsive valve is received within a piston cavity of said hydraulic cylinder in the extended position wherein said flow responsive valve remains in a barrel of said hydraulic cylinder.

* * * * *